Patented Nov. 21, 1950

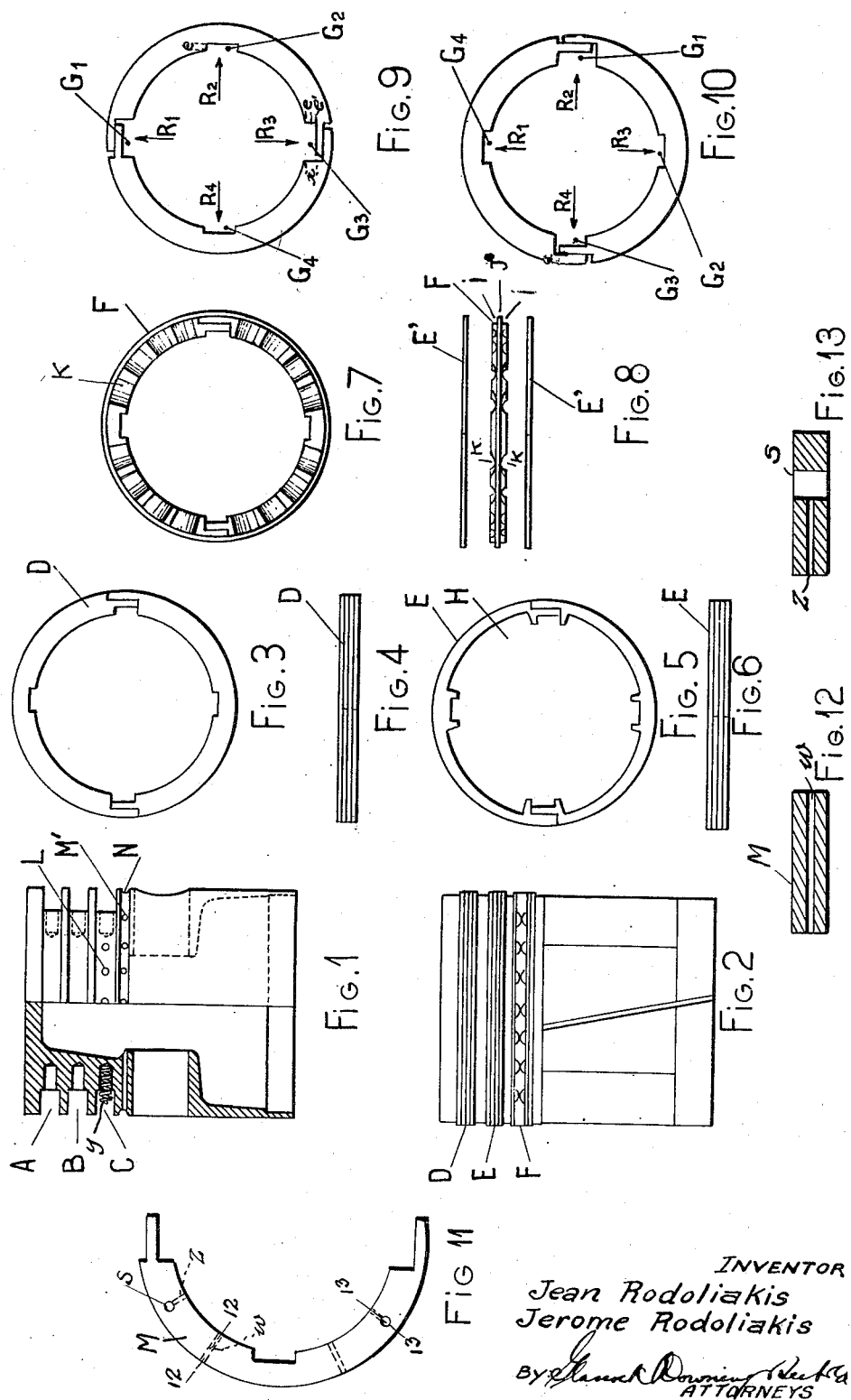

2,531,296

UNITED STATES PATENT OFFICE 2,531,296

TIGHT JOINT FOR PISTONS

Jean Rodoliakis and Jerome Rodoliakis,
Paris, France

Application August 15, 1950, Serial No. 179,576
In France February 9, 1944

7 Claims. (Cl. 309—29)

The present invention relates to an improved piston and ring structure and this application constitutes a continuation-in-part of our prior application Serial Number 638,185 filed December 29, 1945, now forfeited.

A primary object of the present invention is to provide a piston and its associated ring structure in which the rings are segmental, and even though spring pressed are automatically maintained in position on the piston, so that even if the piston is withdrawn from the cylinder the rings remain associated with the piston.

Another object of this invention is to provide a piston and ring structure that insures adequate lubrication between the ring elements and the cylinder wall and between the joints of the ring segments.

A further object is to provide a segmental piston ring structure in which the segments are so constructed that they cooperate with one another to provide an automatic lock to keep them interengaged on the piston.

An additional object is to provide a segmental ring structure in which each element thereof has a tapering cross section providing high elasticity so that the rings engage along their entire length against the cylinder wall regardless of variation in diameter of the cylinder wall due to heat action.

According to the invention the piston is provided with ring receiving grooves and transverse bores extending radially inwardly of the grooves to receive springs and abutments that exert pressure on the ring units disposed in the grooves to expand the rings and maintain them in engagement with the cylinder wall. Each ring unit comprises at least two superposed segmental ring members, the segments or half-elements thereof being provided with tenons and recesses at the opposite ends thereof. The half-elements of each unit are juxtaposed so that the respective tenons and recesses are in interengaging relation to form a sliding assembly. With the half-elements so arranged each unit has on its inner face four notches each spaced 90° apart from its neighbor and including the two notches provided at the interengaging portions of the half-elements with one another and two other notches one formed in the medial portion of each element. The superposed ring members are displaced angularly 90° from each other so that the medial notches of one ring register with the terminal notches of the adjacent ring thereby forming groups of registering notches. The spring means in the bores bear against each group of notches thereby tending to radially move apart the half-elements of those rings, the medial notches of which the spring means engage, the length of the tenons and recesses of the respective half-elements being such that the movement of the spring means is limited by engagement with the terminal notches so that the ring units though segmental and radially expansible remain in interengaged assembled relation in the piston even though the piston with the rings thereon is removed from the cylinder.

Additional features and advantages will be apparent from the following detailed description with reference to the accompanying drawings which illustrate by way of example embodiments of the several features of the invention, in which:

Figure 1 is a view partly in section and partly in elevation of the piston,

Figure 2 is an elevational view of the piston and its associated ring structures, Figures 3, 4, 5, 6, 7 and 8 are views respectively, alternatively in plan and profile of the different ring structures each consisting of four elements and seated in the three grooves arranged one above the other in the piston, Figures 9 and 10 are diagrammatic illustrations facilitating the understanding of the functions of the particular structure of the notches provided on the elements of the ring structures, Figure 11 is a view of a modified ring segment, and Figures 12 and 13 are sectional views on an enlarged scale taken on lines 12—12 and 13—13, respectively, of Figure 11.

As shown the piston has three grooves A, B, C, (Fig. 1) respectively receiving a ring unit D termed the "impact" or "fire-proof" unit, a unit E termed the "tightener" and a unit F termed the "scraper" or "oil regulator."

Each of these ring structures comprises four rings of small thickness, disposed in superposed relation, each ring consisting of two cooperating segments or half-elements in juxtaposed relation, as shown in Fig. 3.

According to a first characteristic of the invention and common to all elements of all the ring structures, there are provided on the inner faces of each ring, four notches G1, G2, G3 and G4 (Figs. 9 and 10) disposed 90° apart, of which two, G1 and G3, are aligned with cooperating tenons and recesses provided at the ends of each segment thus providing a slidable joint between the segments or half-elements. It is herein particularly emphasized that the respective tenons and recesses have a length greater than the difference between the internal diameters of juxtaposed elements, taken at 180° angles, respectively, and bisecting the notches.

The notches G2, G4 which are disposed opposite one another in the middle or medial portion of the two half-elements in juxtaposed relation have a certain depth $e$. while the notches G1, G3 which are aligned with a joint between segments have a greater depth $x$ equal to $e$ plus $e'$, this difference in depth of the notches cooperating with the length of the tenons and recesses in maintaining the segments in place on the piston. The elements of each ring structure are in superposed relation and successively angularly displaced 90° thereby providing groups of registering notches. There are four radial bores in the piston and coil springs in each bore, only one spring y being illustrated in Fig. 1. Conventional headed abutments, not shown, are placed in each spring and each abutment thus acts simultaneously upon the bases of the superposed registering notches G1 of the first element, G2 of the second, G3 of the third and G4 of the fourth of the elements that are superposed and of the same ring structure D, E or F. This specific arrangement affords an automatic locking enabling an assembled ring structure to stay in place in the piston groove in a position of maximum expansion and entirely preventing the two half-elements from being radially forced outward by the action of the springs when the piston is retracted from the cylinder. The manner in which this locking is effected is easily explained if one views Figs. 9 and 10 which show in plan two successive elements of one and the same ring structure. In these figures the action of the springs is represented by arrows R1, R2, R3 and R4. The springs R1 and R3 act in the bottom of notches G1 and G3 of depth e plus e' of the first element (Fig. 9). By reason of the position of these notches in alignment with the joint of the half-elements there cannot be a sliding of these elements in the direction of the common axis of springs R1 and R3. The path of these springs is thus limited by the deepening of the notches G1 and G3 of the first element.

On the other hand, these same springs R1 and R3 acting equally in the bottom of notches G4 and G2 of depth e of the second element, cause thereby a sliding of these two half-elements one with respect to the other by reason of the depth difference e' of notches G4 and G2 on one hand and G1 and G3 on the other hand.

The springs R4 and R2 act in a manner similar but inversely on the two superposed elements. The result is that these stay in place, in a position of maximum expansion in the sense of R4—R2 for the first, R1—R3 for the second.

What is true for two superposed elements is also true for a greater number of elements successively angularly displaced by 90°. In a general way the elements denoted by odd ordinal numbers are expanded in the sense R4—R2 and the elements denoted by even ordinal numbers in the sense R1—R3. The radial expansion e' permitted determines the extent of possible wear of these ring structures.

According to another characteristic of the invention, the half-elements of ring structures E of the so-called "tightening function" are cut away on their inner periphery, as shown in Fig. 5, in such a manner that the cross section increases from the end towards the middle. This construction endows them with an elasticity permitting them to engage exactly and along their entire length against the cylinder surface which effects an absolute tightening whatever the position of the piston within the cylinder may be. It is indeed known that in consequence of differences of temperatures and expansion, it happens that the cylinder diameter of the upper cylinder portion differs from that of the lower portion. The invention obviates entirely this disadvantage. Furthermore, the peripheral outer surface of the elements is not turned entirely circular, but is preferably of oval shape in such manner as to permit a more efficacious elastic adaptation toward the cylinder surface.

Furthermore, the space H is so shaped as to constitute a chamber intended to receive the excess oil escaping by capillarity to the lower scraping ring structure, this excess oil being utilized for the lubrication of the opposite faces of the sliding joints of the half-elements of the ring structure.

Finally the application aims at equally covering the particular form of the ring structure called "scraper" or "oil regulator" shown in Figs. 7 and 8.

This ring structure is composed in the preferred form of embodiment, of two elements E' identical with elements E of the ring structure termed "tightener," disposed above and below element F which constitutes the oil regulator proper, each of these elements comprising two juxtaposed half-elements assembled as above described.

The oil regulator F has upon the upper and lower edge of its outer periphery two recesses i between which is formed a thin circular projecting tongue J the purpose of which is to scrape oil on the cylinder surface. Furthermore the upper and lower faces of this regulator are provided with radial cuts K formed, for example, by milling. These cuts form in cooperation with the smooth surface of adjacent element E' conduits through which the oil scraped by tongue J from the cylinder surface is conducted towards holes L formed in the bottom of groove C (Fig. 1).

The lubrication of the assembly just described functions as follows:

The oil projected under pressure against the cylinder walls is first scraped by the expansible ring E' disposed below the scraper ring F and conducted through the holes M' formed in a special groove N on the piston (Fig. 1). Then a portion of oil passes through the cuts K towards the inner chamber of ring F in order to drop by holes L of groove C into the gear box. In spite of this flowing back the oil seeps by capillarity into space H of ring E' and thus assures absolute tightness and lubrication.

In the modification disclosed in Figures 11, 12 and 13 are illustrated other arrangements of passages providing for lubrication. As shown in Figures 11 and 12 a radial bore w passes through the ring segment M. This ring segment M can either be of the structure shown or embody the tapering sections to provide the space H in a manner similar to the ring structure shown in Figure 5. In addition, if desired, the ring segment M can be provided with the scraping flange J to function in a manner similar to the ring F.

As shown in Figure 13 a lubricating bore z extends radially through the ring M and communicates with the transverse bore s which, of course, insures proper lubrication of the contacting faces of the various ring elements of the superposed ring unit. There is thus provided an arrangement in which the oil adequately seeps between the elements of the various superposed units and also finds its way inwardly of the unit as is true in the case with the structure disclosed in Figures 7 and 8.

Having described our invention what we desire to secure by Letters Patent is:

1. Ring structure for piston comprising a plurality of superposed units of small thickness, each consisting of two half-elements juxtaposed and provided at their ends with tenons and recesses in interengaging relation in such manner as to form a sliding assembly, each unit having on its inner face four notches each spaced 90° from its neighbor, of which two are formed in the medial portions and two in the terminal portions of the two half-elements, the terminal notches being of greater depth than the medial notches, the several superposed units being successively angularly displaced by 90° from their neighbors, in such a manner that the medial notches of one unit register with the terminal notches of the adjacent unit and thereby form groups of registering notches, the respective tenons and recesses of the half-elements having a length greater than the difference between the internal diameters of the juxtaposed elements taken at 180° angle respectively and bisecting the notches, spring means interposed between the piston and each group of notches, the spring means tending to radially move apart the half-elements of those units the medial notches of which the spring means engage and the movement of the spring means being limited by engagement with the terminal notches.

2. Ring structure for piston comprising a plurality of superposed units of small thickness, each consisting of two half-elements juxtaposed and provided at their ends with tenons and recesses in interengaging relation in such manner as to form a sliding assembly, each unit having on its inner face four notches each spaced 90° from its neighbor, of which two are formed in the medial portions and two in the terminal portions of the two half-elements, the several superposed units being successively angularly displaced by 90° from their neighbors, in such a manner that the medial notches of one unit register with the terminal notches of the adjacent unit and thereby form groups of registering notches, and spring means interposed between the piston and each group of notches, the spring means tending to radially move apart the half-elements of those units the medial notches of which the spring means engage, the length of the tenons and recesses of the respective half-elements being such that the movement of the spring means is limited by engagement with the terminal notches.

3. Ring structure for piston comprising a plurality of superposed units of small thickness, each consisting of two half-elements juxtaposed and provided at their ends with tenons and recesses in interengaging relation in such manner as to form a sliding assembly, each unit having on its inner face four notches each spaced 90° from its neighbor, of which two are formed in the medial portions and two in the terminal portions of the two half-elements, the several superposed units being successively angularly displaced by 90° from their neighbors, in such a manner that the medial notches of one unit register with the terminal notches of the adjacent unit and thereby form groups of registering notches, spring means interposed between the piston and each group of notches, the spring means tending to radially move apart the half-elements of those units the medial notches of which the spring means engage, the length of the tenons and recesses of the respective half-element being such that the movement of the spring means is limited by engagement with the terminal notches, and at least one of the units having oil channels providing for the circulation of a lubricant between the units, said oil channels including at least transverse bores extending through the elements of the units and radial bores extending from the inner periphery to and communicating with the respective transverse bores.

4. A ring structure for a piston as defined in and by claim 2 in which the wall thickness of the half-elements diminishes from the medial portion towards the opposite ends thereof.

5. A ring structure for a piston as defined in and by claim 2 in which the half-elements of one of said units also includes a circular flange projecting radially outwardly therefrom and in which the upper and lower faces are provided with radially extending notches defining lubricating channels, the projecting flange constituting an oil scraping element.

6. In combination with a piston having a plurality of vertically spaced, radial ring receiving grooves and radial bores extending inwardly from the bases of each groove, a ring structure in each groove comprising a plurality of superposed units of small thickness, each consisting of two half-elements juxtaposed and provided at their ends with tenons and recesses in interengaging relation in such manner as to form a sliding assembly, each unit having on its inner face four notches each spaced 90° from its neighbor, of which two are formed in the medial portions and two in the terminal portions of the two half-elements, the several superposed units being successively angularly displaced by 90° from their neighbors, in such a manner that the medial notches of one unit register with the terminal notches of the adjacent unit and thereby form groups of registering notches, and spring means in the bores interposed between the piston and each group of notches, the spring means tending to radially move apart the half-elements of those units the medial notches of which the spring means engage, the length of the tenons and recesses of the respective half-elements being such that the movement of the spring means is l'mited by engagement with the terminal notches.

7. A ring structure for a piston as defined in and by claim 6 in which the piston is further provided with radial bores defining oil passages extending inwardly from the base of one of said grooves and in which the ring structure in the said groove from which the oil passages extend compr'ses three superposed units each consisting of two half-elements juxtaposed and in which the upper and lower units have plane surfaces and are of reduced thickness from their medial portions toward their outer ends and in which the medial unit is provided with radial notches on the upper and lower faces thereof, and a circular outwardly projecting flange between the bases of the said notches.

JEAN RODOLIAKIS.
JEROME RODOLIAKIS.

REFERENCES CITED

The following references are of record in the file of this patent:

UNITED STATES PATENTS

| Number | Name | Date |
|---|---|---|
| 1,172,518 | Dilks | Feb. 22, 1916 |
| 1,808,057 | Monteagle | June 2, 1931 |

FOREIGN PATENTS

| Number | Country | Date |
|---|---|---|
| 770,796 | France | Sept. 20, 1934 |